W. G. SCHNEIDER.
AUTOMOBILE HEADLIGHT GLASS.
APPLICATION FILED JULY 19, 1920.
1,391,511. Patented Sept. 20, 1921.
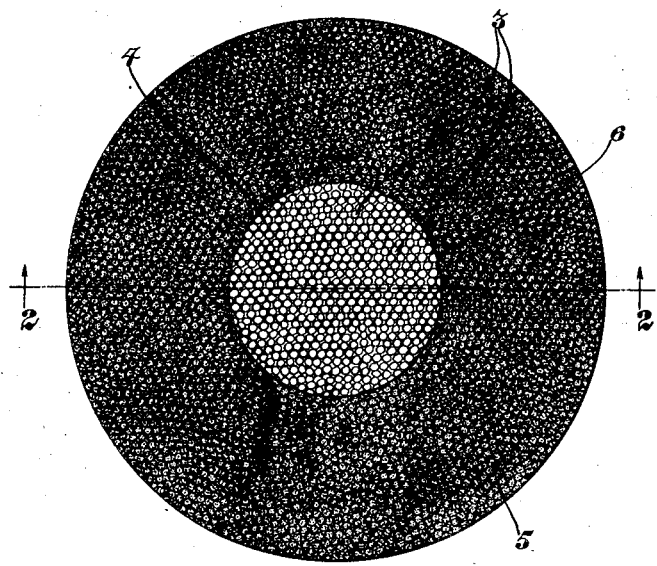
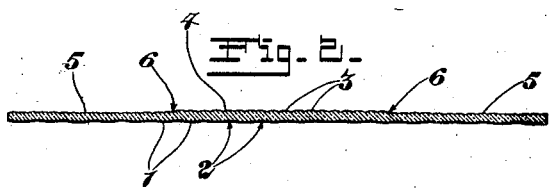
INVENTOR.
WILLIAM G. SCHNEIDER,
BY
*Rippey Kingsland,*
HIS ATTORNEYS.

UNITED STATES PATENT OFFICE.

WILLIAM G. SCHNEIDER, OF ST. LOUIS, MISSOURI.

AUTOMOBILE-HEADLIGHT GLASS.

1,391,511.  Specification of Letters Patent.  Patented Sept. 20, 1921.

Application filed July 18, 1920. Serial No. 397,267.

*To all whom it may concern:*

Be it known that I, WILLIAM G. SCHNEIDER, a citizen of the United States, residing at the city of St. Louis, and State of Missouri, have invented a new and useful Automobile-Headlight Glass, of which the following is a specification.

This invention relates to glass for automobile headlights and for similar uses.

An object of the invention is to provide a glass of the character and for the purposes mentioned which may be economically manufactured and which will diffuse the rays of light projected through the glass in a satisfactory and efficient manner.

Another object of the invention is to provide a glass of the character and for the purposes mentioned which may be manufactured economically.

With the foregoing and other objects in view, which do not require specific mention and which will appear from the following description in which reference is made to the drawing, I have produced a glass of which Figure 1 is a front view, and Fig. 2 is a cross sectional view on the line 2—2 of Fig. 1.

As shown my improved headlight glass comprises a piece of glass which may be of any desired shape and dimensions. The glass is of the rough-rolled or hammered construction having on one side thereof a series of undulations formed by the rollers by which the glass is rolled in the manufacture thereof. The undulations comprise the rounded raised portions 1 extending the full width of the glass and separated by curved bottom depressions 2 extending the full width of the glass, and being formed by the rollers employed to roll the glass during the manufacture thereof.

The opposite side of the glass is of the hammered construction having numerous closely formed rounded elevations 3 giving this side of the glass a spotted appearance. These elevations are formed by the rough or hammered surface of the table upon which the glass is supported while the glass is being rolled during the manufacture thereof. Preferably the undulations, comprising the raised portions 1 and the depressions or spaces 2 between them, are of considerably greater width respectively than the cross sectional width of the elevations 3, as will be readily understood by reference to Fig. 2 in which a cross section of the glass is shown.

In the manufacture of my improved headlight glass a central space 4 of any desired shape and size is provided, and around the central space the glass is frosted forming a central frosted area 5. The frosting of the glass may be effected in any known manner, as by subjecting the glass to a sand blast or by grinding the area to be frosted. This leaves a clear line of demarcation 6 separating the frosted area from the central unfrosted area of the glass, and slightly reduces the thickness of the frosted portion without wholly removing the elevations 3.

A headlight glass constructed as above described wholly eliminates the objectionable glare and brilliancy of the light projected through the glass, and accomplishes the softening and diffusion of the light which is now desired in connection with automobiles, and other vehicles. The appearance of the undulations 1—2 on one side of the glass and the elevations 3 on the other side of the glass diminishes the glare and brilliancy of the light projected through the central portion 4.

It is obvious that the glass may be of any desired thickness or size, and that the dimensions and shape of the central area may be varied in accordance with the needs and preferences of the user. I do not restrict myself to unessential features in this or other particulars, but what I claim and desire to secure by Letters Patent, is:—

1. A headlight glass of the character described, comprising a glass plate having series of undulations over the entire surface of one side thereof, and having outwardly rounded, raised portions forming a spotted arrangement over the entire surface of the opposite side, the cross sectional width of the undulations being greater than the cross sectional width of the rounded raised portions, and the border of the glass being of less translucent character than the central portion of the glass.

2. A headlight glass of the character described, comprising a glass plate having a bordering portion of less thickness than the central portion, said plate having undulations over the entire surface of one side thereof and having outwardly rounded raised portions forming a spotted arrangement over the entire surface of the opposite side, the cross sectional width of the rounded raised portions being less than the cross sectional width of the undulations, and said thinner bordering portion of said plate being of less translucent character than the central portion.

WILLIAM G. SCHNEIDER.